United States Patent
Mathiske et al.

(10) Patent No.: US 7,412,693 B2
(45) Date of Patent: Aug. 12, 2008

(54) METHOD AND APPARATUS FOR DETERMINING FREQUENCY OF EXECUTION FOR COMPILED METHODS WITHIN A VIRTUAL MACHINE

(75) Inventors: Bernd J. W. Mathiske, Cupertino, CA (US); Oleg A. Pliss, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 542 days.

(21) Appl. No.: 10/966,086

(22) Filed: Oct. 15, 2004

(65) Prior Publication Data

US 2005/0198620 A1    Sep. 8, 2005

Related U.S. Application Data

(60) Provisional application No. 60/550,802, filed on Mar. 5, 2004.

(51) Int. Cl.
 *G06F 9/44* (2006.01)
(52) U.S. Cl. ............... 717/127; 717/128; 717/130; 717/131
(58) Field of Classification Search ............... 717/127, 717/128, 130, 131
See application file for complete search history.

(56) References Cited

U.S. PATENT DOCUMENTS

| 5,313,616 | A * | 5/1994 | Cline et al. | 717/127 |
| 6,668,372 | B1 * | 12/2003 | Wu | 717/130 |
| 6,681,387 | B1 * | 1/2004 | Hwu et al. | 717/158 |
| 6,728,949 | B1 * | 4/2004 | Bryant et al. | 717/127 |
| 7,062,684 | B2 * | 6/2006 | DeWitt et al. | 714/45 |
| 2005/0050524 | A1 * | 3/2005 | Booker et al. | 717/130 |

OTHER PUBLICATIONS

Ball, et al. "Efficient Path Profiling", 1996, IEEE, p. 46-57.*
Ball, et al. "Optimally Profiling and Tracing Programs", 1994, ACM, p. 1319-1360.*

* cited by examiner

*Primary Examiner*—Wei Y. Zhen
*Assistant Examiner*—Qamrun Nahar
(74) *Attorney, Agent, or Firm*—Park, Vaughan & Fleming LLP

(57) ABSTRACT

One embodiment of the present invention provides a system that facilitates determining a frequency of execution of compiled methods within a virtual machine. The system starts by determining if a compiled method is executing. If so, the system sets a flag corresponding to the compiled method to indicate that the compiled method is executing. Periodically, the system scans the flag and increments the value of a corresponding counter if the flag is set, and then resets the flag. Finally, the system analyzes the value of the counter to determine a frequency of execution of the compiled method.

39 Claims, 3 Drawing Sheets

METHOD AND APPARATUS FOR DETERMINING FREQUENCY OF EXECUTION FOR COMPILED METHODS WITHIN A VIRTUAL MACHINE

RELATED APPLICATION

This application hereby claims priority under 35 U.S.C. §119 to U.S. Provisional Patent Application No. 60/550,802, filed on 5 Mar. 2004, entitled "Code Cache Eviction Ranking Based on Execution Interval Summarization," by inventors Bernd J. W. Mathiske and Oleg A. Pliss.

BACKGROUND

1. Field of the Invention

The present invention relates to virtual machines within computer systems. More specifically, the present invention relates to a method and an apparatus for determining the frequency of execution of compiled methods within a virtual machine.

2. Related Art

The Java 2 Platform, Micro Edition (J2ME™), has become very popular in the wireless device space. Motorola, Nokia, NTT DoCoMo, RIM, Siemens, and many other key players in the wireless device industry have recently started shipping J2ME-enabled devices in very high volume. It has been estimated that over 200 million J2ME-enabled mobile phones were shipped in 2003 alone.

One major limitation of these wireless devices is the relatively small amount of memory available for executing programs. Many methods have been developed to optimize memory usage in these memory-constrained devices. Once such method involves using a dynamic compiler that supports both the execution of interpreted code and compiled code. Code that is executed more often is compiled and executed in compiled mode, while code that is executed less often is executed in interpreted mode. Note that the compiled code executes much faster than the interpreted code; however, the compiled code takes up a lot more space than the executed code.

Whether this dynamically generated compiled code resides on the object heap or in a separate code cache region of memory, this compiled code is typically evicted from memory when it is no longer frequently accessed, and this eviction typically takes place through a garbage collection (GC) process. Note that the compiled code may contain pointers to objects which are handled by the GC process.

Although the actual eviction of the compiled code happens during GC, the victim selection portion of the eviction process is ideally based on information gathered during mutator execution, wherein the system can gather information to rank compiled methods according to how frequently they are used.

As memory constraints become tighter, the quality of this ranking process becomes increasingly more important to sustaining high overall execution speed. On the other hand, if the ranking mechanism becomes too complicated, obtaining ranking data may create a significant additional burden on the mutator.

In order to determine when a method is in use, it is a common practice to insert software hooks into specific locations in a method. These hooks can gather data and perform various computations when they are encountered during program execution.

Current victim selection schemes that use hooks fall into two categories, heavyweight hooks and lightweight hooks. With heavyweight hooks, the system performs some weighting calculation concerning a routine directly in the above hooks. For example, the hook can increment a counter in a Java method. In contrast, lightweight hooks produce a minimal amount of mutator slowdown by computing as little as possible in the hooks. For example, there is a self-modifying code scheme in the Connected Limited Device Configuration HotSpot Implementation (CLDC HI) within J2ME™ that patches the Java method callee prolog only the first time a hook is executed during a given GC cycle. In subsequent uses of the same routine, there is no mutator overhead.

Another way to determine method usage is to use statistical sampling. Statistical sampling operates by periodically analyzing the current stack to determine when routines are executing. (The statistical sampling method also counts as lightweight, since it typically executes relatively infrequently.)

However, all of the above-described techniques have drawbacks. They either slow down the mutator significantly, or they do not gather enough information for good victim selection. Furthermore, the interval between GCs is generally too large to establish a useful ranking among large numbers of methods. (Reflecting multiple GC intervals in multiple bits as in CLDC HI does not solve this problem, since one GC interval is generally already too long.)

Hence, what is needed is a method for determining a frequency of execution of compiled methods within a virtual machine without the drawbacks listed above.

SUMMARY

One embodiment of the present invention provides a system that facilitates determining a frequency of execution of compiled methods within a virtual machine. The system starts by determining if a compiled method is executing. If so, the system sets a flag corresponding to the compiled method to indicate that the compiled method is executing. Periodically, the system scans the flag and increments the value of a corresponding counter if the flag is set, and then resets the flag. Finally, the system analyzes the value of the counter to determine a frequency of execution of the compiled method.

In a variation on this embodiment, the system adjusts a time interval between incrementations of the counter.

In a variation on this embodiment, the system determines when the compiled method is executed by executing an instruction when the compiled method calls a second compiled method, wherein the instruction sets the flag corresponding to the compiled method.

In a variation on this embodiment, the system determines when the compiled method is executed by executing an instruction when the compiled method is called by a second compiled method, wherein the instruction sets the flag corresponding to the compiled method.

In a variation on this embodiment, the system determines when the compiled method is executed by executing an instruction when returning to a second compiled method from the compiled method, wherein the instruction sets the flag corresponding to the compiled method.

In a variation on this embodiment, the system determines when the compiled method is executed by executing an instruction when returning to the compiled method from a second compiled method, wherein the instruction sets the flag corresponding to the compiled method.

In a variation on this embodiment, the system determines when the compiled method is executed by executing an instruction when initiating a backward branch within the compiled method, wherein the instruction sets the flag corresponding to the compiled method.

In a variation on this embodiment, the system determines when the compiled method is executed by executing an instruction at a target for a backward branch within the compiled method, wherein the instruction sets the flag corresponding to the compiled method.

In a variation on this embodiment, the system evicts the compiled method if the frequency of execution of the compiled method is below a predetermined threshold, so that the method must be subsequently recompiled or interpreted if the compiled method is executed again.

In a further variation, the system adjusts the predetermined threshold to regulate the number of compiled methods.

In a variation on this embodiment, the system periodically decreases the counter to introduce decay, thereby fading the relevance of historical execution of the compiled method over time.

In a further variation, the system periodically decreases the counter when any counter associated with any method reaches a predetermined threshold.

In a variation on this embodiment, the system periodically increases a weight value assigned to the flag so that subsequent executions of the compiled method count more than prior executions of the compiled method.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and does not include computer instruction signals embodied in a transmission medium.

Memory-Constrained Computing Device

Figure 1:
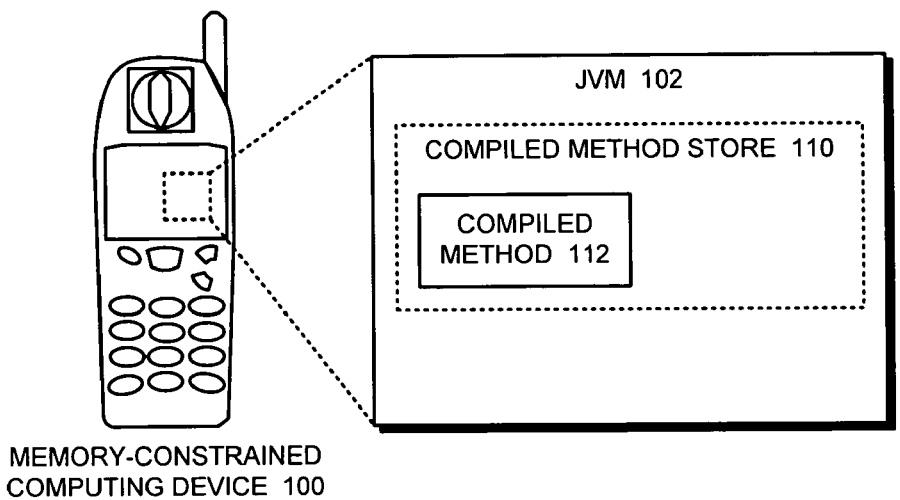
FIG. 1 illustrates a memory-constrained computing device in accordance with an embodiment of the present invention.

FIG. 1 illustrates a memory-constrained computing device 100 in accordance with an embodiment of the present invention. Memory-constrained computing device 100 can include any type of computing device, including, but not limited to, a cell phone, a computer system based on a microprocessor, a digital signal processor, a portable computing device, a personal organizer, a device controller, and a computational engine within an appliance. Memory-constrained computing device 100 contains Java Virtual Machine (JVM) 102, which in turn supports execution of both compiled and interpreted methods. (The terms JAVA, JVM and JAVA VIRTUAL MACHINE are trademarks of SUN Microsystems, Inc. of Santa Clara, Calif.) Note that JVM 102 could be any type of platform-independent virtual machine, and is not meant to be limited to a Java Virtual Machine.

JVM 102 contains compiled method store 110. In order to improve performance within JVM 102, some methods are compiled and added to compiled method store 110, which enables these methods to execute faster than the interpreted methods. However, the compiled methods generally take up more space than the interpreted methods, depending on the quality of the compiled code. Furthermore, in many systems, interpreted code cannot be discarded after compilation. Hence, JVM 102 dynamically compiles only the more frequently used methods and places them in compiled store 110. Additionally, JVM 102 regularly evicts less frequently used compiled methods from compiled method store 110 to save space so that subsequent executions of the method take place in interpreted mode. Such evictions may take place during a garbage-collection operation, as well as during some other eviction operation that operates outside of a garbage-collection operation.

Flag Array

Figure 2:
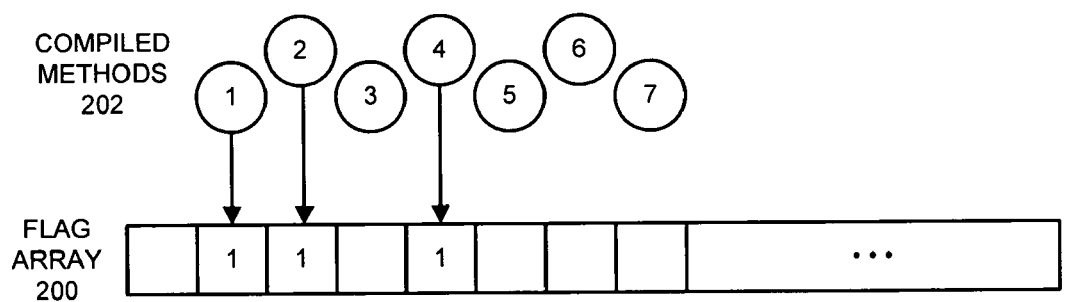
FIG. 2 illustrates a flag array in accordance with an embodiment of the present invention.

FIG. 2 illustrates a flag array 200 in accordance with an embodiment of the present invention. Flag array 200 is used to facilitate victim selection in a manner that achieves nearly the victim selection quality of heavyweight hooks and the overall cost of lightweight hooks as described previously. In one embodiment of the present invention, the dynamic compiler in JVM 102 generates extra code in (1) the prologue of a callee, (2) directly after a call, and (3) directly before a backwards branch. Using the above three locations, one can catch most relevant method access (except for long loop-free code stretches, which are better executed by the interpreter anyway). Other hook placements (or a subset of the above placements) might also work, though probably with less accuracy and thus reduced method ranking quality.

The present invention restricts the hook to a very brief inline action; namely, setting a flag in flag array 200 that corresponds to the routine (method, function) being executed. In the example illustrated in FIG. 2, a bit is set in flag array 200 representing the execution of compiled methods in compiled methods 202. The actual machine instruction to set the flag is chosen to address the smallest addressible memory unit (word, byte, bit) without compromising performance. Typically, it sets one byte. However, in some architectures, it may set an entire word or a single bit. These flags are contained within flag array 200 which is located at an offset specified by a global variable. Each compiled method has its own index (within compiled methods 202) into flag array 200. Note that indices of evicted routines can be reused.

Theoretically, the fact that a method in question has been used at a given point in time will decay in usefulness as mutator execution progresses. As explained above, waiting until a GC happens to harvest the bit and use it for ranking purposes typically takes too long. Gathering more than one bit, on the other hand, increases the mutator burden. The present invention resolves this tension by introducing a third phase in which gathered bits are adjusted to represent the fading of their relevance over time.

Reference Array

Figure 3:
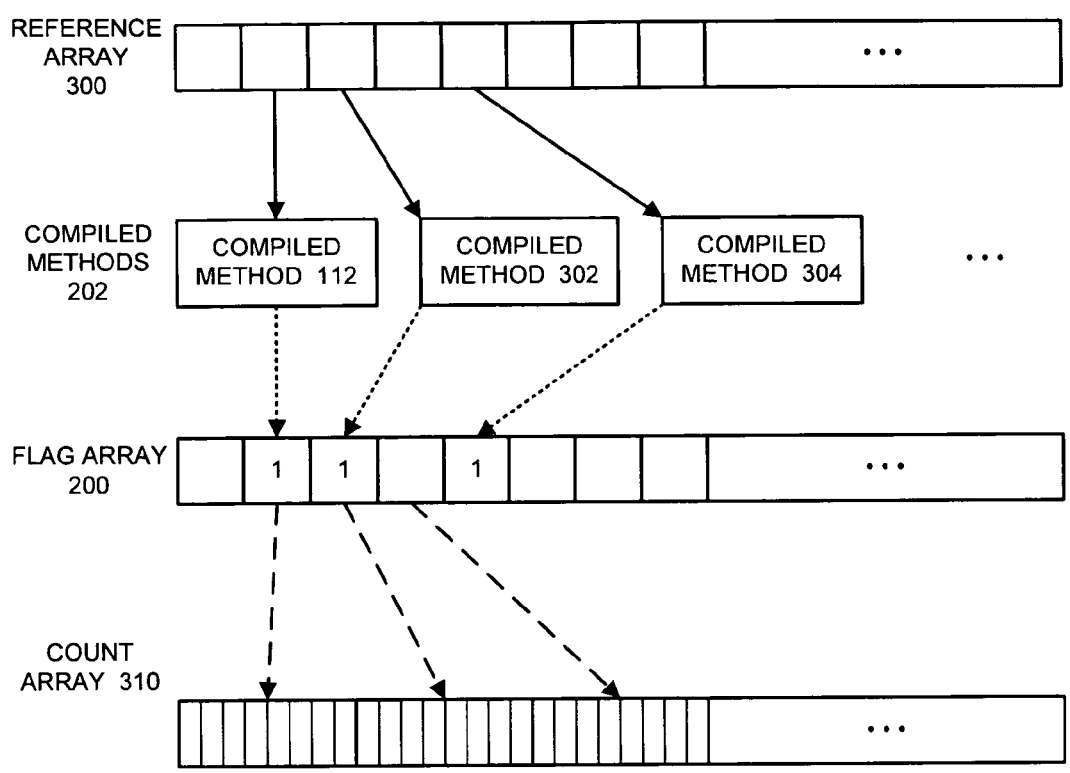
FIG. 3 illustrates a reference array in accordance with an embodiment of the present invention.

FIG. 3 illustrates a reference array 300 in accordance with an embodiment of the present invention. Reference array 300 maps the flag indices back to their respective compiled methods, such as compiled method 112, compiled method 302, and compiled method 304. Furthermore, an extra "count" field is associated with each method. This association can either be provided by a third array, count array 310, or by placing an extra field into each method instance. Using the above data structures, the system can iterate over all compiled routines and update their "count" fields according to which flags have been set. After the count fields are updated, all flags are then reset.

In one embodiment of the present invention, the process of updating the count fields involves two phases. In the first phase, all counts are lowered to fade the relevance of method usage over time. Then, in the second phase, the flag (with possibly some weight factor) is added only to those routines which have a flag set in the given interval.

In another embodiment of the present invention, there is only a single phase in which all counts for methods with set flags are updated, but the weight factor for a set flag is increased at every interval. The count lowering can thus be delayed until GC time, after which the flag weight is reset. Note that this scheme further reduces impact on the mutator.

In a third embodiment of the present invention, count decay is triggered by reaching a certain count threshold for any of the compiled methods. This decay process helps to model typical program execution, which typically involves frequent access to a small compiled working set of methods, wherein the working set evolves over time. During normal program execution, certain methods are executed much more frequently than other methods during a specific time period. Over time, the set of methods that are executed most frequently (the working set), changes as the program executes. In this embodiment, the count decay process is important because it reduces the importance of methods that have executed less recently, which helps result in stronger count values for methods in the working set.

It is also important to consider when more methods are being interpreted rather then executed. In order to increase overall performance, in one embodiment of the present invention, a shift in the workload to the interpreter triggers a decay round. For example, this can be approximated by observing the ratio of interpreted execution to compiled execution during a specific time interval. Effectively, this embodiment of the present invention makes the choice of interval length virtually irrelevant for the decay processing. Its decay "time flow" is decoupled from wall clock time.

Furthermore, at GC time, all methods can be ranked by their accumulated count. The system can either first sort them by count, or can repeatedly search for victims below a certain count threshold, and keep increasing the threshold until a given eviction target is met. Note that the summarization interval needs to be short enough to maintain the relevance of set flags in flag array 200. It also needs to be long enough to spread out mutator burden. In balancing these demands, the system must consider mutator speed, i.e. the rate at which flag setting hooks are hit.

The system also needs to handle index overflow. Each index is assigned to a method before it gets compiled. In cases where there is no available index, the system can either prevent compilation until an index will be freed, or can attempt to usurp the index of a routine with a low current ranking. In the rare case that the original index owner sets a flag, an inaccuracy occurs. However, this is likely to be a rare event, which is best ensured against by choosing a large enough array so that index overflow is unlikely to occur. To accomplish this, the array size can be proportional to the heap size. (For instance, for 1 MB heaps an array with 500 elements could be used).

Setting Flag Bits

Figure 4:
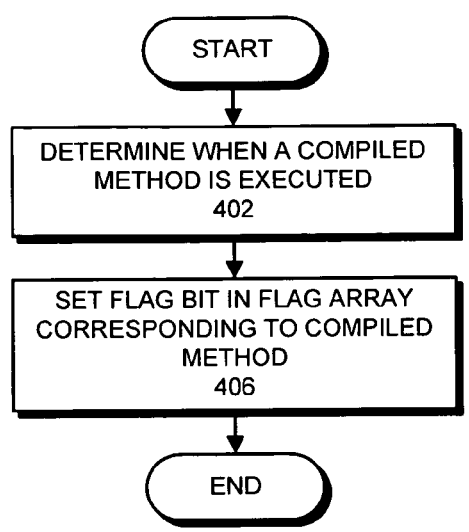
FIG. 4 presents a flowchart illustrating the process of setting flag bits in accordance with an embodiment of the present invention.

FIG. 4 presents a flowchart illustrating the process of setting flag bits in flag array 200 in accordance with an embodiment of the present invention. The system starts by determining when a compiled method, such as compiled method 112, is executed (step 402). This can be accomplished by use of the execution hooks described previously. Finally, the system sets a flag bit in flag array 200 indicating that the compiled method has executed (step 406).

Accumulating Set Flag Bits

Figure 5:
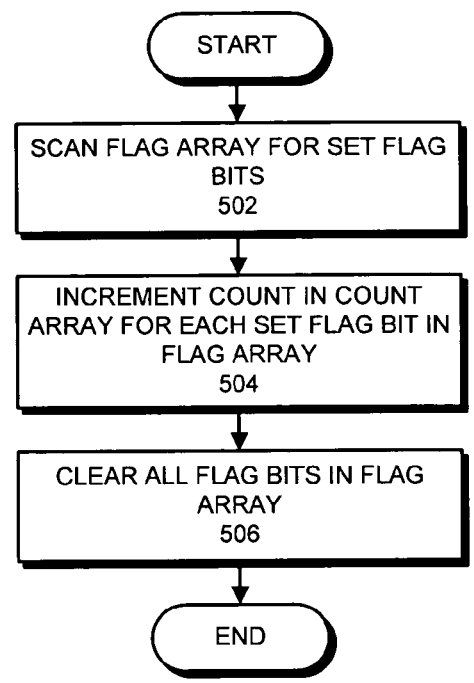
FIG. 5 presents a flowchart illustrating the process of accumulating the set flag bits in accordance with an embodiment of the present invention.

FIG. 5 presents a flowchart illustrating the process of accumulating the set flag bits from flag array 200 into count array 310 in accordance with an embodiment of the present invention. At some periodic interval, the system scans flag array 200 for set flag bits (step 502). For each set flag bit, the system increments a count in count array 310 that corresponds to the flag bit in flag array 200 (step 504). Once all of the appropriate counts in count array 310 have been incremented, the system clears all of the flag bits in flag array 200 for the next periodic interval (step 506). Note that while incrementing count array 310, if the system detects an overflow in one of the counts, the system may shift the bits of count array 310 to introduce a decay as described above.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining a relative frequency of execution of compiled methods within a virtual machine, the method comprising:

a flag array wherein each compiled method has a corresponding index into the flag array;

wherein each compiled method has a corresponding counter;

when a compiled method is executed, setting a flag in the flag array corresponding to the compiled method to indicate that the compiled method is executing;

periodically, scanning the flag array and for each compiled method, incrementing a value of the corresponding counter if the flag corresponding to the compiled method is set to indicate that the compiled method has executed at least once since the flag array was last reset, and then resetting the flag array for subsequent scanning; and for each compiled method, analyzing the value of the corresponding counter to determine a relative frequency of execution of each of the compiled methods.

2. The method of claim 1, further comprising adjusting a time interval between incrementations of the counter.

3. The method of claim 1, wherein determining when the compiled method is executed further involves executing an instruction when the compiled method calls a second compiled method, wherein the instruction sets the flag corresponding to the compiled method.

4. The method of claim 1, wherein determining when the compiled method is executed further involves executing an instruction when the compiled method is called by a second compiled method, wherein the instruction sets the flag corresponding to the compiled method.

5. The method of claim 1, wherein determining when the compiled method is executed further involves executing an instruction when returning to a second compiled method from the compiled method, wherein the instruction sets the flag corresponding to the compiled method.

6. The method of claim 1, wherein determining when the compiled method is executed further involves executing an instruction when returning to the compiled method from a second compiled method, wherein the instruction sets the flag corresponding to the compiled method.

7. The method of claim 1, wherein determining when the compiled method is executed further involves executing an instruction when initiating a backward branch within the compiled method, wherein the instruction sets the flag corresponding to the compiled method.

8. The method of claim 1, wherein determining when the compiled method is executed further involves executing an instruction at a target for a backward branch within the compiled method, wherein the instruction sets the flag corresponding to the compiled method.

9. The method of claim 1, further comprising evicting the compiled method if the frequency of execution of the compiled method is below a predetermined threshold, so that the compiled method must be subsequently recompiled or interpreted if the compiled method is executed again.

10. The method of claim 9, further comprising adjusting the predetermined threshold to regulate a number of compiled methods.

11. The method of claim 1, further comprising periodically decreasing the counter to introduce decay, thereby fading a relevance of historical execution of the compiled method over time.

12. The method of claim 11, further comprising periodically decreasing the counter when any counter associated with any method reaches a predetermined threshold.

13. The method of claim 1, further comprising periodically increasing a weight value assigned to the flag so that subsequent executions of the compiled method count more than prior executions of the compiled method.

14. A computer-readable storage medium storing instructions that when executed by a computer cause the computer to perform a method for determining a relative frequency of execution of compiled methods within a virtual machine, the method comprising:
   a flag array wherein each compiled method has a corresponding index into the flag array;
   wherein each compiled method has a corresponding counter;
   when a compiled method is executed, setting a flag in the flag array corresponding to the compiled method to indicate that the compiled method is executing;
   periodically, scanning the flag array and for each compiled method, incrementing a value of the corresponding counter if the flag corresponding to the compiled method is set to indicate that the compiled method has executed at least once since the flag array was last reset, and then resetting the flag array for subsequent scanning; and
   for each compiled method, analyzing the value of the corresponding counter to determine a relative frequency of execution of each of the compiled methods.

15. The computer-readable storage medium of claim 14, wherein the method further comprises adjusting a time interval between incrementations of the counter.

16. The computer-readable storage medium of claim 14, wherein determining when the compiled method is executed further involves executing an instruction when the compiled method calls a second compiled method, wherein the instruction sets the flag corresponding to the compiled method.

17. The computer-readable storage medium of claim 14, wherein determining when the compiled method is executed further involves executing an instruction when the compiled method is called by a second compiled method, wherein the instruction sets the flag corresponding to the compiled method.

18. The computer-readable storage medium of claim 14, wherein determining when the compiled method is executed further involves executing an instruction when returning to a second compiled method from the compiled method, wherein the instruction sets the flag corresponding to the compiled method.

19. The computer-readable storage medium of claim 14, wherein determining when the compiled method is executed further involves executing an instruction when returning to the compiled method from a second compiled method, wherein the instruction sets the flag corresponding to the compiled method.

20. The computer-readable storage medium of claim 14, wherein determining when the compiled method is executed further involves executing an instruction when initiating a backward branch within the compiled method, wherein the instruction sets the flag corresponding to the compiled method.

21. The computer-readable storage medium of claim 14, wherein determining when the compiled method is executed further involves executing an instruction at a target for a backward branch within the compiled method, wherein the instruction sets the flag corresponding to the compiled method.

22. The computer-readable storage medium of claim 14, wherein the method further comprises evicting the compiled method if the frequency of execution of the compiled method is below a predetermined threshold, so that the compiled method must be subsequently recompiled or interpreted if the compiled method is executed again.

23. The computer-readable storage medium of claim 22, wherein the method further comprises adjusting the predetermined threshold to regulate a number of compiled methods.

24. The computer-readable storage medium of claim 14, wherein the method further comprises periodically decreasing the counter to introduce decay, thereby fading a relevance of historical execution of the compiled method over time.

25. The computer-readable storage medium of claim 24, wherein the method further comprises periodically decreasing the counter when any counter associated with any method reaches a predetermined threshold.

26. The computer-readable storage medium of claim 14, wherein the method further comprises periodically increasing a weight value assigned to the flag so that subsequent executions of the compiled method count more than prior executions of the compiled method.

27. An apparatus for determining a relative frequency of execution of compiled methods within a virtual machine, comprising:
   a processor;
   a memory;
   a flag array wherein each compiled method has a corresponding index into the flag array;
   wherein each compiled method has a corresponding counter;
   a determination mechanism configured to determine when a compiled method is executed;

a flag setting mechanism configured to set a flag in the flag array corresponding to the compiled method to indicate that the compiled method is executing, if the compiled method is executing;

a scanning mechanism configured to periodically scan the flag array and for each compiled method, increment a value of the corresponding counter if the flag corresponding to the compiled method is set to indicate that the compiled method has executed at least once since the flag array was last reset, and to reset the flag array for subsequent scanning; and an analysis mechanism configured to analyze the value of the corresponding counter for each compiled method to determine a relative frequency of execution of each of the compiled methods.

28. The apparatus of claim 27, further comprising an adjustment mechanism configured to adjust a time interval between incrementations of the counter.

29. The apparatus of claim 27, wherein the determination mechanism is further configured to determine when the compiled method is executed by executing an instruction when the compiled method calls a second compiled method, wherein the instruction sets the flag corresponding to the compiled method.

30. The apparatus of claim 27, wherein the determination mechanism is further configured to determine when the compiled method is executed by executing an instruction when the compiled method is called by a second compiled method, wherein the instruction sets the flag corresponding to the compiled method.

31. The apparatus of claim 27, wherein the determination mechanism is further configured to determine when the compiled method is executed by executing an instruction when returning to a second compiled method from the compiled method, wherein the instruction sets the flag corresponding to the compiled method.

32. The apparatus of claim 27, wherein the determination mechanism is further configured to determine when the compiled method is executed by executing an instruction when returning to the compiled method from a second compiled method, wherein the instruction sets the flag corresponding to the compiled method.

33. The apparatus of claim 27, wherein the determination mechanism is further configured to determine when the compiled method is executed by executing an instruction when initiating a backward branch within the compiled method, wherein the instruction sets the flag corresponding to the compiled method.

34. The apparatus of claim 27, wherein the determination mechanism is further configured to determine when the compiled method is executed by executing an instruction at a target for a backward branch within the compiled method, wherein the instruction sets the flag corresponding to the compiled method.

35. The apparatus of claim 27, further comprising an eviction mechanism configured to evict the compiled method if the frequency of execution of the compiled method is below a predetermined threshold, so that the compiled method must be subsequently recompiled or interpreted if the compiled method is executed again.

36. The apparatus of claim 35, further comprising an adjustment mechanism configured to adjust the predetermined threshold to regulate a number of compiled methods.

37. The apparatus of claim 27, further comprising a decay mechanism configured to periodically decrease the counter to introduce decay, thereby fading a relevance of historical execution of the compiled method over time.

38. The apparatus of claim 37, wherein the decay mechanism is further configured to periodically decrease the counter when any counter associated with any method reaches a predetermined threshold.

39. The apparatus of claim 27, further comprising a weighting mechanism configured to periodically increase a weight value assigned to the flag so that subsequent executions of the compiled method count more than prior executions of the compiled method.

* * * * *